United States Patent
McKeown et al.

(10) Patent No.: US 6,725,135 B2
(45) Date of Patent: Apr. 20, 2004

(54) VEHICLE STABILITY OPERATOR FEEDBACK SYSTEM

(75) Inventors: Steve McKeown, Campbellford, CA (US); Bruce Gilkes, Calgary, CA (US); Jon Sheaff, Campbellford, CA (US)

(73) Assignee: Stability Dynamics, Campbellford (CA)

( * ) Notice: Subject to any disclaimer, the term of this patent is extended or adjusted under 35 U.S.C. 154(b) by 0 days.

(21) Appl. No.: 09/963,917

(22) Filed: Sep. 26, 2001

(65) Prior Publication Data

US 2003/0060950 A1 Mar. 27, 2003

(51) Int. Cl.[7] ............................................. B60R 21/13
(52) U.S. Cl. .......................... 701/29; 701/38; 701/72; 701/124; 73/65.01; 180/282; 280/755
(58) Field of Search .......................... 701/29, 38, 48, 701/72, 73, 75, 78, 124; 73/65.01; 180/282; 280/755; 340/429

(56) References Cited

U.S. PATENT DOCUMENTS

| | | | |
|---|---|---|---|
| 1,368,941 A | 2/1921 | Klein | 33/333 |
| 2,443,098 A | 2/1948 | Dean | 701/124 |
| 2,751,921 A | 6/1956 | Baldwin et al. | 137/98 |
| 3,003,254 A | 10/1961 | Pattison | 434/401 |
| 3,746,844 A | 7/1973 | Azum et al. | 701/124 |
| 3,889,524 A | 6/1975 | Glushko et al. | 73/65.01 |
| 4,149,140 A | 4/1979 | Evans et al. | 340/443 |
| 4,312,042 A | 1/1982 | Bateman | 701/124 |
| 4,627,011 A | 12/1986 | Spencer et al. | 701/70 |
| 4,935,885 A | 6/1990 | McHale et al. | 702/175 |
| 4,949,269 A | 8/1990 | Buisson et al. | 701/124 |
| 5,034,896 A | 7/1991 | Orgun et al. | 701/124 |
| 5,571,953 A | 11/1996 | Wu | 73/65.06 |
| 5,583,777 A | 12/1996 | Power | 701/124 |
| 5,869,943 A | 2/1999 | Nakashima et al. | 340/440 |
| 6,038,495 A | 3/2000 | Schiffmann | 303/7 |
| 6,130,608 A | 10/2000 | McKeown et al. | 340/438 |
| 6,176,555 B1 | 1/2001 | Semsey | 701/1 |
| 6,262,658 B1 | 7/2001 | O'Connor | 318/586 |
| 6,456,194 B1 * | 9/2002 | Carlson et al. | 340/440 |

FOREIGN PATENT DOCUMENTS

| | | |
|---|---|---|
| DE | 4416991 | 11/1995 |
| DE | 0758601 | 7/1996 |
| EP | 1110835 | 12/2000 |

* cited by examiner

Primary Examiner—William A. Cuchlinski, Jr.
Assistant Examiner—Arthur D. Donnelly
(74) Attorney, Agent, or Firm—Pearne & Gordon LLP

(57) ABSTRACT

System for monitoring vehicle operating conditions and parameters and issuing warnings to the operator when a predetermined vehicle status is present. The predetermined vehicle status includes a variety of unsafe driving conditions and is responsive to a changing center of gravity. The warnings include visual, audible and tactile feedback. By way of the tactile feedback, the system can affect the operator's operation of the vehicle to prevent vehicle instability, rollover, loss of vehicle control or other unsafe driving conditions from occurring.

20 Claims, 1 Drawing Sheet

VEHICLE STABILITY OPERATOR FEEDBACK SYSTEM

BACKGROUND OF THE INVENTION

1. Field of the Invention

The present invention relates to a system for monitoring vehicle operating conditions and parameters and providing feedback to the vehicle's operator indicating potential vehicle instability.

2. Description of the Related Art

Many vehicles, including construction equipment, firefighting vehicles, large trucks and so-called sport-utility vehicles, have high centers of gravity (C.O.G.'s) This results in decreased stability, an increased risk of vehicle rollover and/or loss of vehicle control, as well as other safety-related concerns.

Further, when loaded with cargo or passengers, the C.O.G, of a vehicle will change. The inability of the operator to anticipate a vehicle's handling characteristics based upon the changing C.O.G. of a vehicle may be largely responsible for many accidents.

As a result, devices have been devised that measure forces acting on a vehicle and warn the operator when these forces exceed safe levels. In response, the operator can slow the vehicle or widen the turning radius.

One such device is disclosed in U.S. Pat. No. 6,130,608. This device measures lateral g-forces or acceleration and sounds an audible alarm when the g-forces exceed a set threshold. The threshold can be adjusted by the operator.

As the C.O.G. of the vehicle changes, its ability to remain stable with the presence of changing levels of lateral forces also changes. Thus, to be effective, the threshold must be adjusted on such occasions as when an unloaded vehicle is loaded with cargo or a vehicle's boom is extended or bed raised. Further, fuel consumption and the resulting emptying of a vehicle's fuel tank will change a vehicle's handling characteristics.

However, known devices rely upon the operator to set the appropriate level. In many cases, the operator will be unable to properly estimate an appropriate threshold, adjust it too high to avoid the nuisance of the alarm, or neglect to adjust the threshold when the vehicle's load changes.

SUMMARY OF THE INVENTION

According to an aspect of the present invention, a vehicle condition operator feedback system is provided. The system comprises a vehicle operating condition determining means for determining a plurality of operating conditions, at least one of the plurality of operating conditions being affected by a present center of gravity of the vehicle. The system further comprises a control means for deducing the presence of a predetermined vehicle status based upon an operating condition signal received from the determining means. The system further comprises an operator feedback means for indicating the presence of the predetermined vehicle status to the operator of the vehicle based upon a control signal received from the control means.

DETAILED DESCRIPTION OF THE INVENTION

Figure 1:
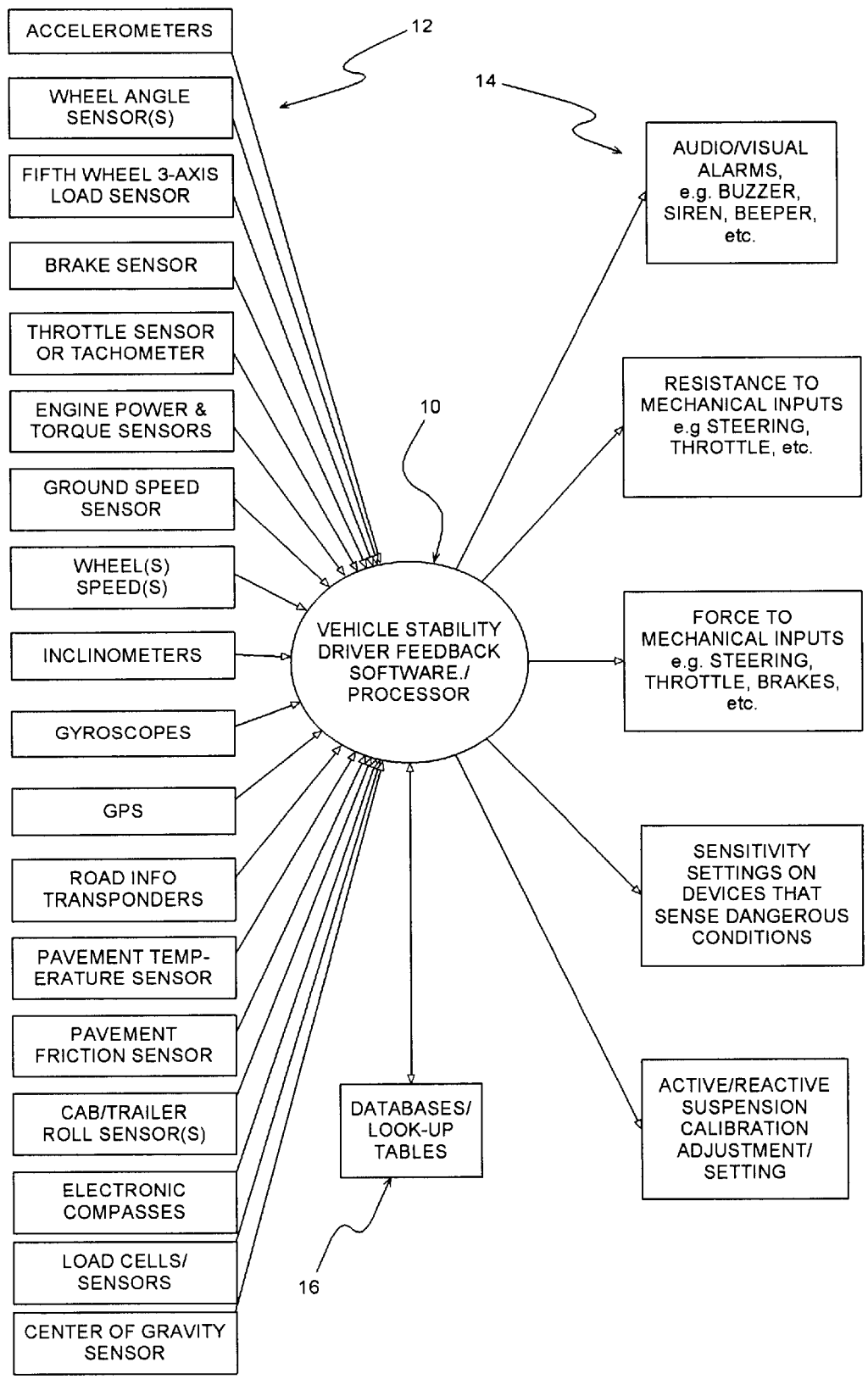
FIG. 1 is a schematic illustration of a vehicle stability operator feedback system according to one embodiment of the present invention.

FIG. 1 illustrates the general interconnection of components of an embodiment of the present invention. A vehicle condition operator feedback processor, controller or other control means 10 receives a plurality of signals from a vehicle operating condition determining means or apparatus which comprises various sensors 12 mounted in a vehicle (not shown). Each of the sensors is capable of measuring a specific condition related to the operation, configuration or environs of the vehicle. The sensors 12 include measurement or detection of accelerations and decelerations (including lateral g-forces), steering actuator position. wheel angle positions, load characteristics, brake actuator position, brake fluid pressure, throttle actuator position, engine revolution speed, engine power, engine torque, ground speed, wheels differential speeds, incline, GPS-based or other speed, location and heading determinations, road transponder information, ambient pavement temperature, pavement friction, and vehicle roll rate. Additional sensors that are known in the art for determining a vehicle condition can also be used. The term determining as used herein refers to determining, detecting, sensing, measuring, obtaining, acquiring, calculating and the like. Further, "vehicle operating condition" as used herein includes vehicle conditions, environmental conditions affecting vehicle operation, and the like. Those vehicle conditions listed herein are intended by way of example only, and other determined conditions can be used without depart from the intended scope of the present invention.

There are generally two types of vehicle conditions which can be determined by the sensors 12. The first type is determined conditions that are largely dependent on the specific characteristic vehicle as it is presently configured, such as vehicle suspension and frame response to static loading. These conditions are affected by a vehicle's changing C.O.G. Other conditions are largely independent of the vehicle and relate to the present operation of the vehicle, such as lateral g-forces, velocity, acceleration, inclination and wheel angles. Some of the measured conditions may be both vehicle and operation dependent.

By using a vehicle operating condition signal or input of one or more of the sensors 12, the processor 10 is capable of deducing when a potentially unsafe driving condition may be present and warning the driver or operator of the vehicle. As used herein, "predetermined vehicle status" includes, but is not limited to, a potential for vehicle instability, a potential for vehicle rollover, a potential for loss of vehicle control, and any other potentially unsafe driving condition. The processor 10 uses previously gathered or predefined data from a database or lookup table 16 related to a specific vehicle having certain variable or changing conditions, including load and C.O.G., various calculations and algorithms, and other techniques to deduce the presence of the predetermined vehicle status. Since the vehicle conditions include conditions that vary with or are affected by the vehicle's present C.O.G., the operation of the processor 10 is responsive to the changing C.O.G. of the vehicle. Thus, no adjustment of the processor 10 or sensors 12 by the operator is required when the C.O.G. of the vehicle changes.

A basic dynamic model of a vehicle from either analysis or experiment is programmed into the processor 10 to serve as an initial model. The processor 10 will then use the basic model to deduce a vehicle specific model and then store it as the initial model in the database 16 for this specific vehicle.

The processor 10 uses knowledge-based algorithms including, but not limited to, rule-based algorithms, neural network techniques, programmed set-limits and digital signal processing to determine the present vehicle condition, including stability as affected by a changing center of gravity, in real time and predict the possible vehicle behavior in the immediate future based on present operating conditions.

One or more operator feedback means or apparatuses are connected to the processor 10. When the processor 10 determines that an unsafe condition may be present or is likely to occur, it sends a control signal to activate one or more of these feedback means 14. The feedback means 14 include various types of visual and audible alerts, such as buzzers or flashing lights.

Another type of feedback means 14 is tactile feedback. One type of tactile feedback includes providing resistance to a mechanical input, such as the vehicle's steering mechanism or throttle pedal, using known techniques. The resistance has the effect of making it more difficult for the operator to narrow the vehicle's turning radius using the steering wheel or accelerate using the throttle pedal. In this way, the processor 10 communicates to the operator of the vehicle that it may not be safe to further increase the vehicle's speed or to tighten the turning radius. Other mechanical components of the vehicle could also be controlled in this way.

Further, another type of feedback means 14 includes providing positive force and/or backforce to vehicle controls or mechanical inputs, such as the vehicle's steering mechanism, brakes or throttle actuator, using known techniques. This force feedback has an effect similar to the application of resistance, except that it pushes back with a force greater than that which was originally applied by the operator. However, the force exerted is negligible, such that it may be overcome by the operator. The backforce provides operator awareness of increasing levels of vehicle instability and prompts the operator to modify his/her operation of the vehicle's brakes to slow the vehicle. Other mechanical components of the vehicle could also be controlled in this way vehicle to prevent rollover, such as slowing the vehicle or increasing turn radius.

An additional type of feedback is vehicle control override. This type of feedback is similar to tactile feedback, and specifically to force feedback, except that force is applied to the mechanical inputs with a force too great for the operator to reasonably overcome. Alternatively the force may be applied directly to a control mechanism of the vehicle, such as the vehicle's accelerator, steering mechanism or brakes. Vehicle control override has the effect of modifying the vehicle operation automatically, without the operator's intervention. Override is especially useful when vehicle instability or another condition becomes so great that the operator would not have adequate time to react if prompted by another form of feedback.

An output of the processor 10 could also be connected to an existing device that determines the presence of dangerous driving conditions and alerts the operator, such as that disclosed in U.S. Pat. No. 6,130,608, the entire disclosure of which is incorporated herein by reference. In this case, the processor 10 could be adapted to increase or decrease the lateral g-force threshold of the device, as appropriate based upon present vehicle conditions.

Further, an output of the processor 10 could be connected to control an active or reactive vehicle suspension calibration, adjustment or setting using known techniques to provide optimum performance or increased vehicle dynamic stability based upon present conditions.

The processor 10 has three principal modes of operation: a monitoring mode, a learning mode, and an operating mode. In the monitoring mode, the processor 10 can be used to acquire data from the sensors 12 for different conditions and store the data in the database 16 or transmit the data for use by vehicle monitoring computers for simulation and analysis. The monitoring mode would allow engineers to determine appropriate limits and formulas for use by the processor in the operating mode. Additionally, the acquired data could be used to fundamentally improve the configuration of the vehicle.

In the learning mode, the processor 10 acquires data from the sensors 12 as well as user input to set various operating limits for use in the operating mode. During the learning mode, the engineer performs various tests on the vehicle under different operating conditions and indicates to the processor 10 when maximum safe operating conditions are reached or exceeded. Acquired data may be stored in the database or lookup table 16.

In the operating mode, the processor 10 would acquire and process data from the sensors 12 related to present operating conditions and determine present vehicle stability based upon algorithms and/or database 16 information and control the operator feedback means 14 as appropriate.

Additional possible operation modes of the processor 10 may include vehicle accident recording, route simulation, route optimization, turn-apex detection, steering feedback, and operator training.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A vehicle condition operator feedback comprising:
    a vehicle operating condition determining apparatus mounted to a vehicle, the determining apparatus determining a plurality of operating conditions, at least one of the plurality of operating conditions being affected by a present center of gravity of the vehicle;
    a controller which receives an input from the determining apparatus and deduces the presence of a predetermined vehicle status; and
    an operator feedback apparatus, activated by the controller to indicate the presence of the predetermined vehicle status to the operator of the vehicle based upon the input, the feedback apparatus providing at least one form of feedback comprising at least one of an audible warning, a visual warning, a tactile warning, and vehicle control override;
    wherein each of the plurality of operating conditions is selected from acceleration, deceleration, steering actuator position, steering rate, wheel angle position, load, brake actuator position, brake fluid pressure, throttle actuator position, engine revolution speed, engine power, engine torque, ground speed, driving wheels differential speed, incline, location, road transponder information, ambient pavement temperature, pavement friction, vehicle roll rate, center of gravity and heading.

2. The system of claim 1, wherein the controller activates the feedback apparatus based upon a comparison of the input to predefined data.

3. The system of claim 1, wherein the controller activates the feedback apparatus based upon an algorithm.

4. A vehicle stability driver feedback system comprising:
    a vehicle operating condition sensing apparatus mounted to a vehicle, the sensing apparatus sensing a plurality of operating conditions;
    a controller which receives an input from the sensing apparatus; and a driver feedback apparatus, activated by the controller to indicate an impending rollover or condition of instability to the driver of a vehicle based upon the input, the feedback apparatus providing at least one form of feedback selected from an audible warning, a visual warning, and a tactile warning;

wherein at least one of the plurality of operating conditions is determined on the basis of information acquired from a global positioning system.

5. The system of claim 4, wherein the controller activates the feedback apparatus based upon a comparison of the input to predefined data.

6. The system of claim 4, wherein the controller activates the feedback apparatus based upon an algorithm.

7. A vehicle condition operator feedback system comprising:

a vehicle operating condition determining means for determining a plurality of operating conditions, at least one of the plurality of operating conditions being affected by a present center of gravity of the vehicle;

a control means for deducing the presence of a predetermined vehicle status based upon an operating condition signal received from the determining means; and an operator feedback means for indicating the presence of the predetermined vehicle status to the operator of the vehicle based upon a control signal received from the control means;

wherein the control means send the control signal based upon an algorithm.

8. The system of claim 7, wherein the feedback means provides at least one form of feed back provided by at least one of an audible warning means for providing an audible warning, a visual warning means for providing a visual warning, a tactile warning means for providing a tactile warning, and a vehicle control override means for overriding an operation of a vehicle control mechanism.

9. The system of claim 7, wherein the control signal is based upon a comparison of the operating condition signal to predefined data.

10. The system of claim 7, wherein the control means send the control signal based upon an algorithm.

11. A vehicle condition operator feedback system comprising:

a vehicle operating condition determining means for determining a plurality of operating conditions, at least one of the plurality of operating conditions being affected by a present center of gravity of the vehicle;

a control means for deducing the presence of a predetermined vehicle status based upon an operating condition signal received from the determining means; and an operator feedback means for indicating the presence of the predetermined vehicle status to the operator of the vehicle based upon a control signal received from the control means;

wherein at least one of the plurality of operating conditions is determined on the basis of information acquired from a global positioning system.

12. The system of claim 11, wherein the feedback means provides at least one form of feed back provided by at least one of an audible warning means for providing an audible warning, a visual warning means for providing a visual warning, a tactile warning means for providing a tactile warning, and a vehicle control override means for overriding an operation of a vehicle control mechanism.

13. The system of claim 11, wherein the control signal is based upon a comparison of the operating condition signal to predefined data.

14. The system of claim 11, wherein the control means send the control signal based upon an algorithm.

15. A method for alerting an operator to the presence of a predetermined vehicle status in a vehicle, comprising steps of:

determining a plurality of operating conditions of a vehicle, at least one of the plurality of operating conditions being affected by a present center of gravity of the vehicle;

deducing the presence of predetermined vehicle status based upon the determined plurality of conditions; and indicating to an operator the presence of the predetermined vehicle status;

wherein the plurality of operating conditions are selected from acceleration, deceleration, steering acceleration, deceleration, steering actuator position, steering wheel angle position, load, brake actuator position, brake fluid pressure, throttle actuator position, engine revolution speed, engine power, engine torque, ground speed, driving wheels differential speed, incline, location, road transponder information, ambient pavement temperature, pavement friction, vehicle roll rate, center of gravity and heading.

16. The method of claim 15, wherein the step of deducing includes a comparison of the input to predefined data.

17. The system of claim 15, wherein the step of deducing includes the use of an algorithm.

18. A method for alerting an operator to the presence of a predetermined vehicle status in a vehicle, comprising steps of:

determining a plurality of operating conditions of a vehicle, at least one of the plurality of operating conditions being affected by a present center of gravity of the vehicle;

deducing the presence of predetermined vehicle status based upon the determined plurality of conditions; and indicating to an operator the presence of the predetermined vehicle status;

wherein at least one of the plurality of operating conditions is determined on the basis of information acquired from a global positioning system.

19. The method of claim 18, wherein the step of deducing includes a comparison of the input to predefined data.

20. The system of claim 18, wherein the step of deducing includes the use of an algorithm.

* * * * *

UNITED STATES PATENT AND TRADEMARK OFFICE
CERTIFICATE OF CORRECTION

PATENT NO. : 6,725,135 B2
DATED : April 20, 2004
INVENTOR(S) : Steve McKeown et al.

It is certified that error appears in the above-identified patent and that said Letters Patent is hereby corrected as shown below:

Title page,
Item [56], References Cited, please insert the following:
-- OTHER REFERENCES
Highway Star; "Major Advances - Safety is a High Tech Game"; prior to December, 2000 --.

Signed and Sealed this

Twenty-fourth Day of August, 2004

JON W. DUDAS
*Director of the United States Patent and Trademark Office*